A. A. ULRICH.
PROTECTOR.
APPLICATION FILED APR. 23, 1913. RENEWED JUNE 4, 1914.
1,110,017.
Patented Sept. 8, 1914.
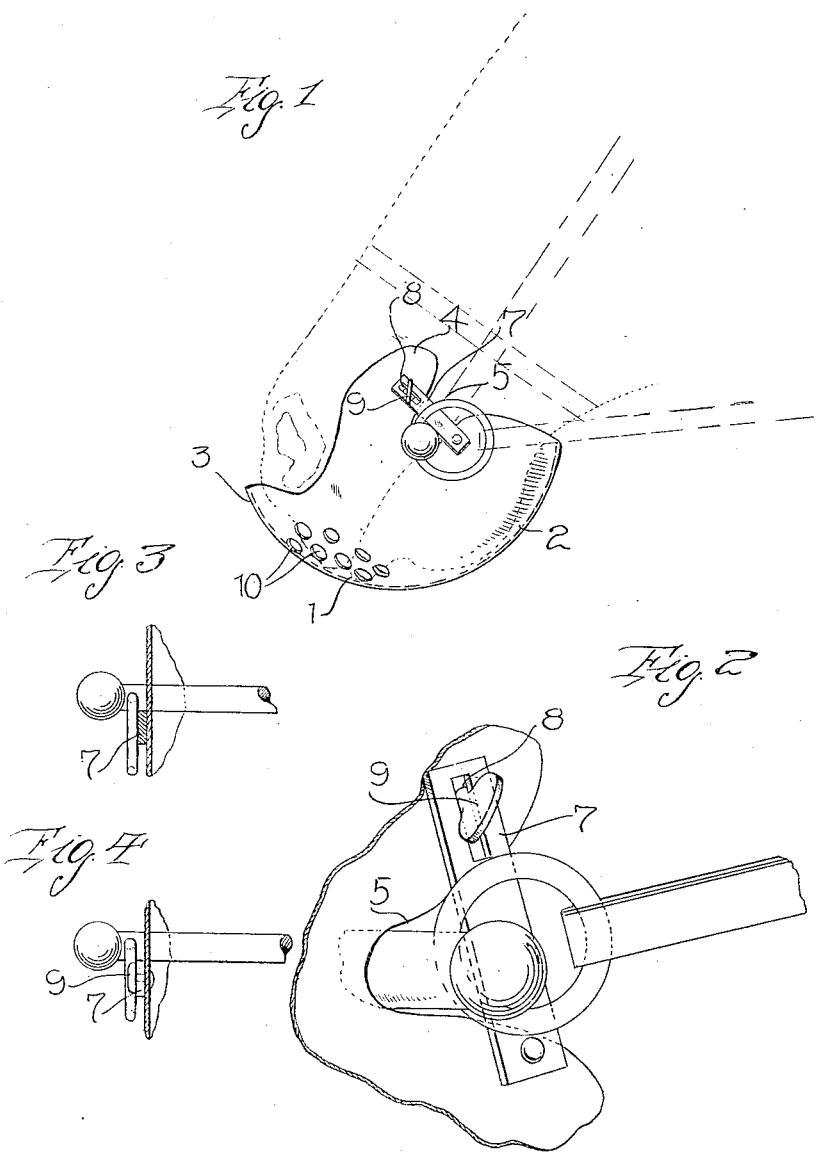
Witnesses
Robert M. Sutphen
A. I. Hind
Inventor
Alva A. Ulrich
By Watson E. Coleman
Attorney

UNITED STATES PATENT OFFICE.

ALVA A. ULRICH, OF EPPING, NORTH DAKOTA.

PROTECTOR.

1,110,017.    Specification of Letters Patent.    Patented Sept. 8, 1914.

Application filed April 23, 1913, Serial No. 763,125. Renewed June 4, 1914. Serial No. 843,090.

*To all whom it may concern:*

Be it known that I, ALVA A. ULRICH, a citizen of the United States, residing at Epping, in the county of Williams and State of North Dakota, have invented certain new and useful Improvements in Protectors, of which the following is a specification, reference being had to the accompanying drawings.

This invention relates to new and useful improvements in protectors and more particularly to a protector which is especially adapted for application to horses, mules and other draft animals, the object of the invention is to provide a protector adapted for application to a draft animal to protect the animal's lips from being bitten by small insects such as bots, which sting the animals upon the lips and cause great annoyance not only to the animal, but to the driver.

Another object of the invention is to provide a protector of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claim and shown in the accompanying drawings, in which—

Figure 1 is a side elevation illustrating the application of my improved protector; Fig. 2 is a detail enlarged perspective view of one end of the bit, showing the manner of securing the protector upon the animal's nose; Fig. 3 is a detail sectional view illustrating the relative position of the lever with respect to the bit; and Fig. 4 is a similar detail view.

In forming my improved protector, I prefer to construct the same of tin or other suitable pliable sheet metal. The protector itself comprises a substantially dome shaped body portion 1, having at one side an arcuate extension 2. The dome shaped body portion 1 is adapted to fit over the lips of the animal and the extension 2 arranged beneath the lower jaw of the animal, while the side of the body opposite the extension 2 extends up on to the nose of the animal, as shown at 3. The body is provided adjacent the extension 2 with the outwardly projecting ears 4 which form longitudinal recesses 5 adapted for the reception of the extending ends of the bit, when arranged in the animal's mouth so that the protector will not interfere with the driving of the animal, in any way.

In fastening my improved protector upon the horse's nose, I provide the pivoted levers 7, each having one end movably secured to the upper edge of the extension 2 and the other end thereof provided with a slot 8 adapted for the reception of a pivoted button 9, said button being carried by the ears 4 and adapted to be disposed transversely across the slot when in an operative position to hold the lever 7 in its locked position.

From the accompanying drawings, it will be readily apparent that in the construction of my improved protector, the body portion thereof is made of light sheet metal and that the levers 7 are each formed of a strip of sheet metal containing certain resilient powers, thus the combined resiliency of the ears 4 and the levers 7 is sufficient so that when it is desired to release the slotted ends of the levers, the ears 4 may be pressed inwardly toward the horse's head to a certain extent and the levers 7 may also be bent outwardly to a certain extent so that the same may be readily removed from the pivoted button 9. It will be apparent that the above operation may be readily carried out by having the body of the protector constructed of a light weight sheet metal containing a certain amount of resiliency.

In placing the lever 7 in position across the bit opening 5, the same is to be arranged beneath the usual bit rings which are secured to each end of the body and to which the driving lines are fastened. Thus it will be apparent that the lever 7 will be arranged at the rear of the body so that the bit will prevent the protector from leaving the horse's nose.

From the above description taken in connection with the accompanying drawings, it will be readily apparent that I have provided a simple and durable protector which can be readily applied to a horse's nose to protect the lips of the animal from being stung by bots or other small insects. I also provide the body portion 1 of the protector with a plurality of openings 10 so that the animal may readily breathe therethrough. It will be apparent that the device may be readily applied by fastening the lever 7 in position or may be quickly removed by turning the button 9 and disengaging the lever 7 therefrom. It will also be apparent that the device in itself is extremely simple in construction and can be manufactured at a comparatively low cost. The protector in itself, if desired, may be stamped from a single piece of material and the lever 7 and the button 9 readily applied thereto.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A protector including a dome shaped body formed of one continuous piece of sheet metal, having a plurality of perforations therein, an arcuate extension formed integral at one side of said body, ears formed on said body and arranged in spaced relation with the side edges of the extension to provide slots for the reception of the ends of a bit, pivoted levers carried by the arcuate extension each having a slot formed in one end thereof, and pivoted buttons carried by the ears and arranged to be inserted through said slots and engaged with the levers to retain the same in their locked position and securely fasten the protector to a horse's nose.

In testimony whereof I hereunto affix my signature in the presence of two witnesses.

ALVA A. ULRICH.

Witnesses:
H. D. SCHAAF,
CHAS. E. ULRICH.

Copies of this patent may be obtained for five cents each, by addressing the "Commissioner of Patents, Washington, D. C."